Figures 1, 2, 3, 4, 5:
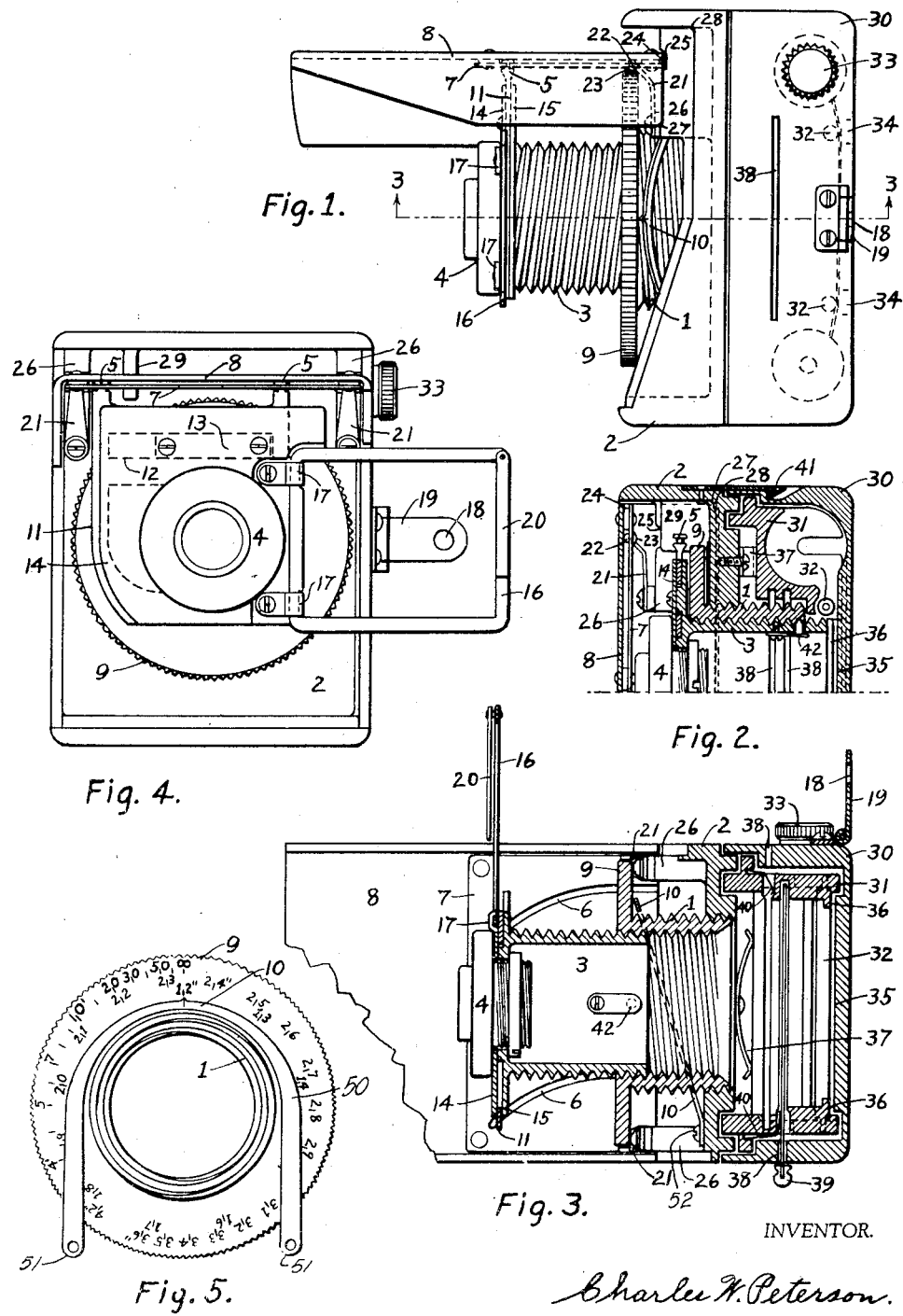

Jan. 16, 1940.　　　C. W. PETERSON　　　2,187,093
CAMERA
Filed June 3, 1937

INVENTOR.
Charles W. Peterson.

Patented Jan. 16, 1940

2,187,093

UNITED STATES PATENT OFFICE 2,187,093

CAMERA

Charles W. Peterson, Cincinnati, Ohio

Application June 2, 1937, Serial No. 146,248

5 Claims. (Cl. 95—45)

My invention relates to improvements in folding roll film cameras, whereby one compact camera can do work heretofore requiring several cameras.

One of the objects of my invention is to provide the lens with a rigid light tight extension means of long extension, and containing a long accurate focusing scale, so that either close copying work or distant scenes may be quickly focused.

A second object is to provide a view finder which changes both in area covered and in direction of sight with focus, so that the area seen in the view finder always coincides with the area focused on the film, no matter how far away or close the object is to the camera.

A third object is to provide the camera with several closable detachable roll film backs so that pictures can be taken in any sequence on any desired number of different kinds of film.

I attain these objects by the camera illustrated in the accompanying drawing in which—

Fig. 1 is a side view of the camera open at its longest extension; Fig. 2, the top half vertical section of the camera closed; Fig. 3, a section of the camera on line 3, 3, Fig. 1; Fig. 4, a front view of the camera at its longest extension; and Fig. 5, a rear view of the focusing flange and pointer removed from the camera.

Similar numerals refer to similar parts throughout the several views.

The general design of the camera shown in this drawing is such that all of the main body parts may be advantageously moulded of plastic material such as Bakelite.

Referring to all figures, the usual camera bellows is replaced by an outer tube 1, having right hand threads on its outside engaging threads in camera body 2, and left hand threads inside engaging outside threads on an inner tube 3 which holds lens and shutter 4, and which is kept from twisting by two feet 5, 5 in guide slots 6, 6 in guide plate 7 mounted on camera bed or lid 8. Focusing extension is accomplished by turning knurled flange 9, which is part of outer tube 1, with the fingers until focusing pointer 10 points at the numeral corresponding with the distance the object is away from the camera. The focusing pointer 10 is preferably formed from the material of a flexible member which, in the preferred embodiment, comprises a U-shaped leaf-spring 50 the ends 51 of which are fastened by means of screws 52, or other suitable fastening means, in the camera body 2. Any surplus play in the screw threads of the tubes, which might affect the accuracy of focusing, may be eliminated by two thread chasing spring members spaced 120 degrees apart for each tube, one of which is shown at 42 in Figs. 2 and 3.

Referring to Fig. 4, guide feet 5, 5 are part of a sliding plate 11 with rectangular guide slot 12 engaging guide block 13, and confined by cover plate 14 and end flange 15, Fig. 1, of inner tube 3. To sliding plate 11 is attached viewfinder frame 16 by means of two spring hinge members 17 which allow frame 16 to be folded back over shutter when camera is to be closed. The purpose of sliding plate 11 is to move viewfinder frame 16, in and out with focusing, to compensate for the parallax between the center line of sight of the camera lens and the eye hole 18 of the folding rear member 19 of the view finder system. This motion is made correct by the appropriate design of the curve of guide slots 6, 6. The guide feet 5, 5 in guide slots 6, 6 thus perform two duties during focusing,—to keep inner tube 3 from turning, and to move viewfinder frame 16 in and out from the lens.

Referring to Figs. 3 and 4, viewfinder frame 16 carries a plummet 20, freely pivoted at the corner shown. Plummet 20 hangs coinciding with the end of frame 16 when the camera is plumb for horizontal pictures, as in Fig. 4, and hangs coinciding with a side of frame 16 when the camera is plumb for vertical pictures, as in Fig. 3.

If it is desired to widen the angle of sight through the viewfinder eye hole 18, and to diminish the size of viewfinder frame 16, a magnifying lens may be put in eye hole 18 and a reducing lens in frame 16. In this case the amount of curve in guide slots 6, 6 must also be lessened in proportion to the amount the size of frame 16 is reduced by the lenses.

The construction of the hinges of camera lid 8 may be seen best in Figs. 2 and 1. The anchored part of each of the two hinges is a strong spring 21 having cylinders 22, forming a T at its free end, fitting in sockets 23 of plate 7. Hinge springs 21, 21 serve two other purposes beside anchoring the hinges; namely, to force end 24 of lid 8 into notches 25, 25 of notch blocks 26, 26 to hold lid 8 out in proper position to act as camera guide bed and sun shade when camera is open, and to hold corners 27, 27 of lid 8 tightly in corners 28, 28 of camera body 2, which gives the proper leverage, to keep the lid firmly closed when in the folded position.

When the camera is closed as shown in Fig. 2, guide feet 5, 5 are confined between the inner side of right hand notch block 26, Fig. 4, and the inner side of block 29, so that they will be in proper position to meet guide slots 6, 6, Fig. 3, when camera bed 8 is first opened and focusing extension is started by turning knurled flange 9.

Referring to Figs. 1, 2 and 3, the removable roll film back consists of an outer shell 30 containing the film spool holding frame 31 having the usual two film rollers 32, 32. In Fig. 1, a film is shown, in dotted lines, being wound from one film spool to the other by means of winding knob 33. The usual colored film windows 34, 34 are also shown in dotted lines. Referring to Figs. 2 and 3, the film is held flat against the flat inside back surface 35 of shell 30, by means of rollers 32, 32 and the sides 36, 36 of frame 31, by the transmitted pressure of springs 37, 37 mounted on camera body 2. Shell 30 and frame 31 have through them two slots 38, 38 for two light tight slides, one of which is shown in place at 39 in Fig. 3. Wide thin springs 40, 40 keep light from entering through slots 38, 38 when slides 39 are out. The film back is fastened to camera body 2 by means of two spring hooks, one of which is shown at 41, Fig. 2.

To load the camera with film, the back is unhooked, knob 33 pulled out, film holding frame 31 slid out of shell 30 and the film spools inserted and threaded in this frame. The loaded frame 31 is now re-inserted in shell 30, film winding knob 33 pushed in, the back snapped back on camera body 2 and the film wound to exposure No. 1. If it is desired to keep the loaded back as a spare, it is closed and held together by slides 39 in both slots 38, 38 instead of snapping it back on camera body 2.

When it is desired to interchange a back on the camera, containing one kind of film, for a back containing another kind, one of the slides 39 is pulled out of the new back and shoved in a slot 38 of the back on the camera, as shown at 39 in Fig. 3. This back is now unhooked from the camera body and the new back snapped on. The remaining slide 39 is now pulled out and inserted in the remaining slot 38 in the removed back, and the interchange is complete.

These backs, when on the camera, have interior space for housing the rear projection of the screw extension tubes 1 and 3 when the camera is closed, as shown in Fig. 2. As drawn, they provide room for the inner tube 3 to project further back than tube 1, so the greatest focusing extension possible, for a given size of camera, is obtained by making the inner tube 3 longer than outer tube 1, and giving the inner tube threads a correspondingly greater pitch. In the camera shown, full extension is accomplished by three revolutions of focusing flange 9, and is obtained by having outer tube 1 advance three doubly paralleled threads and inner tube 3 advance three triply paralleled threads. This gives the lens a total extension of fifteen threads for focusing the closest possible object, which is one foot for the camera drawn. As the focusing scale is drawn in Fig. 5, one revolution of knurled flange 9 brings the lens out to infinity focus, and then two more revolutions bring it to one foot focus. It would do equally well to have one and a half turns bring the lens out to infinity focus and one and a half turns more to one foot focus. Very accurate focusing may be done for any distance, as the focusing numerals are spread far apart in a two turn spiral on flange 9.

Referring to Figs. 3 and 5, focusing pointer 10 is made of thin spring material, and sprung so that it follows flange 9 as it is screwed out. It bends downward, at the same time as it bends outward, and follows the diminishing spiral of the focusing numerals.

Having thus described the various constructional details of my improved camera, one may understand how it fulfills my object of invention of having one camera take the place of several. It may be used as a folding "hand camera", "candid camera" and long extension "copying camera". It takes the place of focusing back and reflex cameras, and saves the time of ground glass focusing, because the parallax compensating frame viewfinder locates the object as accurately as a full size focusing ground glass and the long spiral focusing scale makes perfect focusing possible when the object distance is known. In this connection, distances of over five feet may be estimated with sufficient accuracy for focusing and the short distances for copying can be readily found with a tape measure.

One of my improved cameras with three film backs can also take the place of three separate cameras, each loaded with a different kind of film, as for instance: one loaded with Panchromatic film, one Kodachrome and one Infra Red film. Also, by having different styles of interchangeable backs different shapes of roll film may be used, as for instance: with the $1\frac{1}{16}'' \times 1\frac{5}{16}''$ size of camera, one back may take No. 828 film, one No. 127 film for 16 exposures and one 35 mm. cine film, thus combining three styles of cameras in one.

What I claim as new and wish to protect by Letters Patent is:

1. In a folding camera, a light tight focusing extension means consisting of an outer tube with right hand threads on its outside engaging threads in the camera body and having a flange at its front end on which the focusing scale numbers are inscribed in a diminishing spiral of more than one turn, a flexible pointer having one end secured to the camera body and a portion resting on said flange so that the pointer will bend out and down following the spiral path of the scale numbers as the focusing flange is screwed out, an inner tube with left hand threads on its outside engaging threads in the inside of the outer tube, and a guide member on said inner tube engaging a guide on a non-rotatable part of camera so that inner tube cannot rotate but is free to move in and out focusing the lens which is mounted at its front end.

2. In a camera, a threaded focusing extension tube, a flange on said tube on which the focusing scale numbers are inscribed in more than one turn of a diminishing spiral, and a flexible pointer mounted on the camera body with its movable and resting resiliently against said flange so as to bend outward and downward following said spiral of numbers as the flange is screwed out.

3. A focusing lens mount for a camera, comprising a lens mount support, an extensible tubular sleeve rotatably mounted on said support and movable in an axial direction into and out of said support to produce a lens focusing adjustment, a dial mounted on said sleeve and formed with a spirally arranged focusing scale and a flexible indicator finger interposed between said support and dial and having one end fixed to the support and its opposite end yieldingly contacting with the dial and cooperating with said scale for denoting the lens focusing adjustment.

4. In a camera, the combination with a camera body, of a tubular member threadably engaging said body, a lens carried by said member, a flange formed on said member for rotating the latter to simultaneously shift said member and lens axially to focus the latter, said flange being formed with a spirally arranged focusing scale, a leaf spring having one end secured to said body and a flexible portion arranged to yieldably engage said flange, and a pointer on said flexible portion adapted to cooperate with said scale to indicate the distance for which said lens is focused.

5. In a camera, the combination with a camera body, of a tubular sleeve threadably engaging said camera, a second sleeve threaded into said first sleeve, a lens carried by said second sleeve, a flange formed on said first sleeve for rotating the latter to simultaneously shift both of said sleeves axially to focus said lens, said flange being provided with a spirally arranged scale, a leaf spring having one end secured to said body and a flexible portion arranged to yieldably engage said flange and to follow the latter during the axial movement of said sleeves, and the pointer on said portion arranged to cooperate with said scale to indicate the distance for which said lens is focused.

CHARLES W. PETERSON.